Figure 1:
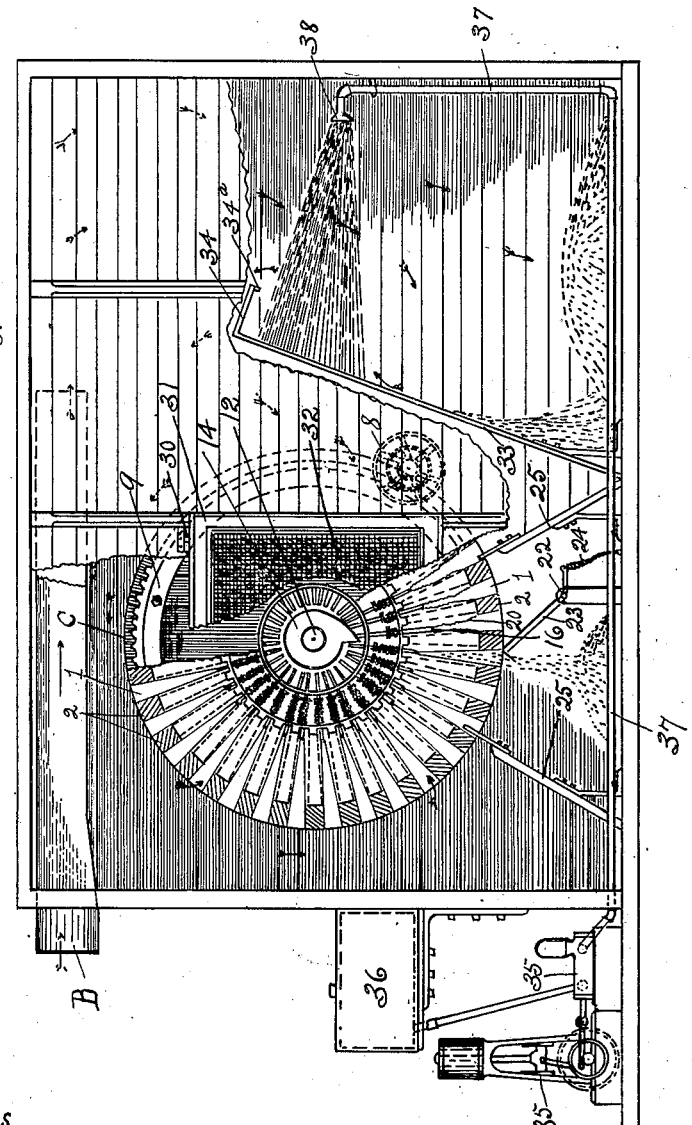

No. 810,771. PATENTED JAN. 23, 1906.
B. KERN, Jr.
DUST COLLECTOR.
APPLICATION FILED JAN. 27, 1905.

2 SHEETS—SHEET 1.

WITNESSES

INVENTOR
Bernard Kern, Jr.,
By Owen & Owen
His attorneys.

No. 810,771. PATENTED JAN. 23, 1906.
B. KERN, JR.
DUST COLLECTOR.
APPLICATION FILED JAN. 27, 1905.
2 SHEETS—SHEET 2.
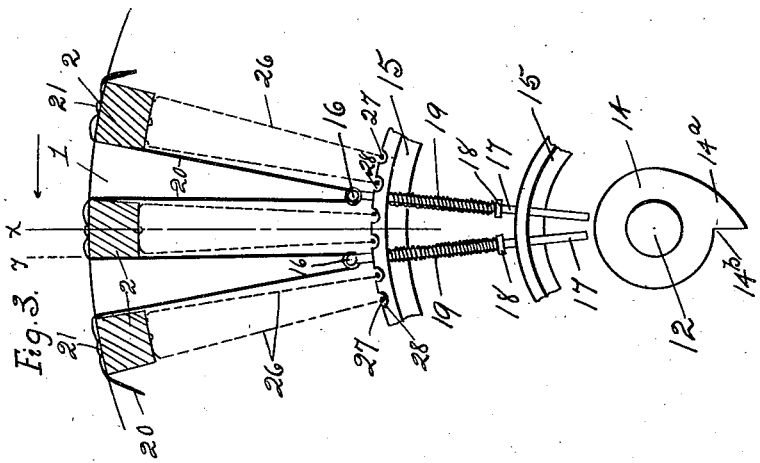
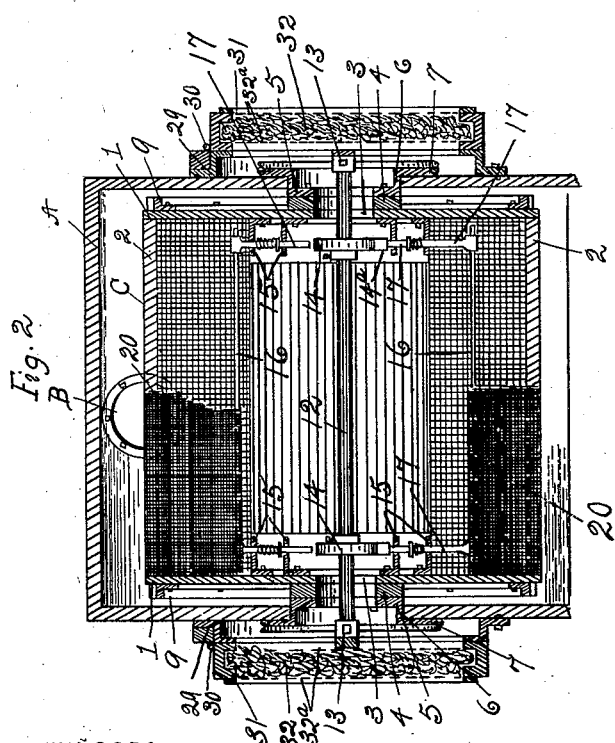
WITNESSES
Cornell Schreiber
Mary I. Shay
INVENTOR
Bernard Kern, Jr.
By Owen & Owen
His attorneys.

UNITED STATES PATENT OFFICE.

BERNARD KERN, JR., OF TOLEDO, OHIO.

DUST-COLLECTOR.

No. 810,771.  Specification of Letters Patent.  Patented Jan. 23, 1906.

Application filed January 27, 1905. Serial No. 242,833.

*To all whom it may concern:*

Be it known that I, BERNARD KERN, Jr., a citizen of the United States, and a resident of Toledo, in the county of Lucas and State of Ohio, have invented certain new and useful Improvements in Dust-Collectors; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to the class of dust-collectors in which a revolving drum or reel is employed to collect and arrest particles of dust and dirt which are not themselves of sufficient weight to freely gravitate when expelled by an agitating element into a receiving-chamber.

The object of my invention is to provide a dust collector or strainer that is simple, effective, and positive in its operation and so constructed as to cause the dust which is discharged to and agitated within a chamber by an air-blast to be arrested and prevented from escaping into the open air while at the same time permitting the air-blast to escape freely from the chamber without undue back pressure upon the source of air-supply.

In the use of dust-collectors in the dust-receiving bins of machines—for instance, such as street-sweepers—difficulty has arisen from the fact that the dust-collecting medium very frequently becomes impaired by reason of its being taxed beyond its capacity by the large quantity of dust and fine particles of dirt discharged into the dust-chamber.

An object of my invention is to reduce to a minimum the dust to be arrested and settled by the operation of the dust-collector, thereby greatly facilitating the work of apparatus of this class, and also to disinfect the sweepings or other forms of dust and dirt discharged into the receiving-chamber.

Further objects and advantages of my invention will be apparent by reference to the following description and the accompanying drawings, in which—

Figure 1 is a side elevation of my machine with the wall of the receiving-chamber partly removed and showing the dust-collector in partial transverse section. Fig. 2 is a central vertical section of the dust-collector, and Fig. 3 is a transverse section of a portion of the dust-collector enlarged.

Referring to the drawings, A indicates the dust chamber or bin of the machine embodying my invention, into which the matter containing the dust is discharged through the supply-conduit B, which latter is furnished with an air-blast from any suitable source for creating the proper draft therein.

The dust-collecting mechanism is mounted at one end of the chamber A and comprises an open drum or reel C, which is arranged to revolve about its axis and to collect or arrest the particles of dust or other fine matter as they are drawn therein by the air-draft. The drum or reel C consists of the spaced end disks 1, which are connected at their peripheries by equidistant bars or slats 2. Through the center of each of the disks 1 is an opening 3, surrounding the outer margin of which and secured to the face of the disk is a spacing-collar 4. Secured to the outer face of each collar 4 is a correspondingly-shaped collar 5, which has a collar 6 projecting laterally therefrom and fitting within a circular opening provided in the vertical side wall of the dust-bin A, which openings act as bearings upon which the drum or reel is revolved. The collar 6 is provided at its outer margin with a vertical flange 7, which is adapted to fit closely against the margin of the opening or bearing in the side wall of the bin for the purpose of protecting it from dust. The rotation of the drum is effected by means of a pinion 8, engaging a gear-wheel or circular rack 9, secured to the outer sides of the disks 1, said pinion being actuated by any suitable means. (Not shown.)

A shaft 12 extends axially through the drum or reel C and is supported and rigidly secured against rotation by cross-bars 13, extending transversely of its ends and secured within the collars 6. Upon the shaft 12 and within the reel or drum C are fixed two cams 14, one adjacent to each of the disks 1. The disks 1 are each provided on their inner faces with two axially-arranged concentric flanges 15, through each of which flanges are equidistant openings or apertures in radial alinement and corresponding in number and space with the bars or slats 2, but radially alternating therewith. A series of straight horizontal rods 16, corresponding in number with the number of bars or slats 2, extend across from one pair of flanges to the other. These rods 16 are suitably mounted at their ends in the bars or arms 17, which are disposed at right angles to said rods and in the same plane, and each passes through a pair of the radial openings in the flanges 15. The bars or arms 17 are of sufficient length to project through the inner flange in proximity to the faces of the cams 14. A nut or shoulder 18 on each of the portions 17 between the flanges 15 is engaged by a coiled spring 19, interposed between the shoulder and the outer flange 15. The effect of the spring is to hold the ends of the portions 17 normally projected inwardly toward the associated cam 14.

20 is a piece of open-meshed fabric and is passed continuously over each of the slats or bars 2 of the drum or reel C and under the horizontal portions of the rods 16, thus forming a fold or cul-de-sac in the fabric between each pair of bars, as shown in Fig. 3. The fabric 20 is loosely looped under the rods 16, but has its points of contact with the outer surfaces of the bars 2 secured against movement by retaining-strips 21 or other suitable means, when by reason of the pressure of the springs 19 the radial portions 17 of the rods 16 are pressed inwardly toward the cam 14 and the folds of the fabric are drawn taut, as illustrated in Fig. 3. As the reel or drum revolves the inner extremities of the arms 17 come in contact with the raised portions 14<sup>a</sup> of the fixed cams, thereby causing the rods 16, with their extremities 17, to be pressed outwardly and allowing the folds of the fabric 20 to become loose. As the ends of the arms 17 slip off the raised portion 14<sup>a</sup> of the cam and drop into the abrupt depression 14<sup>b</sup> thereon the rods 16, actuated by the springs 19, are caused to resume their normal position with a sudden jerk, thus causing the associated fabric fold to flap violently and free itself of all accumulated dust.

Pivoted below the drum or reel C, as at 22, is a hammer or knocker-arm 23, the striking part of which rests normally against the outer face or surface of the bars or slats 2 as they in turn rotate above the same. As each slat passes out of contact with the hammer the spring 24 at its opposite end causes said hammer to fall against and violently knock the next succeeding bar, thus materially aiding in freeing the dust and dirt from the cloths 20 and also from crevices or other accumulating-points on the inner surface of the bars or slats.

Stretching across the width of the bin A below the drum C are the wings 25, which extend from the floor of the bin A to almost in contact with the periphery of the revolving drum or reel. A strip of flexible material—for instance, such as leather—is secured to the upper edge of each wing 25 in position to have contact with the bars or slats 2 of the reel. The wings 25 are intended to form a receptacle in which the particles freed from the reel C are deposited and also to protect the deposited matter from the agitating effect of the air-blast as it is expelled to the bin through the conduit B.

Secured to each of the radial sides of each of the bars or slats 1 and between the slat and the open-meshed fabric 20 is a wire screen 26, which extends across the interior width of the frame or reel and is stretched inwardly the distance of the width of the folds of the fabric 20. The inner margin of each screen 26 is suitably secured to a rod, bar, or stout wire 27, which reaches across the interior of the drum from side to side and has its ends seated and suitably secured within slots or recesses 28, formed in the periphery of the outer flange 15, as shown in Fig. 3. The purpose of this series of wire screens is to prevent the folds of the fabric 20 when an air-blast passes in between them from being blown into contact with each other, which would prevent the passage of air through the meshes of the cloth.

Around each of the openings in the vertical side walls of the bin A in which the bearing-collars 6 fit is a frame 29, to which is hinged, as at 30, a door 31. This door consists of a frame adapted to close tightly against the frame 29 on the bin A, or against the side of the bin should said latter frame be eliminated, and has felt, cotton, wool, sponge, hair, moss, or the like, as shown at 32, secured within its opening between two wire screens 32<sup>a</sup> to serve as a sieve or screen for the air which passes therethrough from the interior of the dust-bin. In the construction of machines of this class it has been customary to provide the opening forming the exit for the air-blast with a single gauze or wire screen, or with both, the wire screen acting as a strengthening means for the gauze. This method of straining the expelled air of the very fine particles of dust which escaped the operation of the dust-collector is found to have many disadvantages, which are more or less apparent in different classes of work. By the use of gauze or wire screens the air-blast is permitted to have substantially a direct passage through its meshes, thereby carrying the extremely-fine particles of dust that have escaped the operation of the dust-collector to the outer atmosphere. In some cases the expelling of the air in force from the machine is found to be very objectionable—as, for instance, in street-sweeping machines—as the air in such case would be discharged laterally therefrom in the faces of passers-by. By the use of my improved method of providing a body of cellular substance—such as felt, cotton, wool, sponge, moss, or the like—within the air-exit this difficulty, as well as the escaping of the finer particles of dust from the machine, are obviated, as the air is caused to find a circuitous passage therethrough, thus breaking its force and causing the dust particles to adhere to the straining substance.

To the rear of the drum or reel C within the bin A is erected a rearwardly-slanting partition 33, which arises from the bottom of the bin and extends to a height with respect to the drum or reel C, substantially as shown. The top of the partition 33 is formed with a rearwardly-extending flange 34, having a downwardly-extending lip 34$^a$ provided on its free edge. As the matter-laden air-blast leaves the conduit B it strikes against the rear wall of the bin A and is deflected forwardly by it against the slanting partition 33 and required to traverse the height of said partition and around the flange or baffle-plate 34 before entering the drum or reel C. The purpose of the partition 33 and flange 34 is to impede the progress of the air-blast and cause the particles which are not of sufficient weight to immediately gravitate to the bottom of the bin as they are liberated from the conduit B to strike against and have their momentum arrested thereby, so that only the finer particles of dust are carried to the drum or reel C.

A sprinkler system is employed within the bin A for disinfecting the dust discharged thereto and also acting in conjunction with the partition 33 to minimize the amount of dust to enter the drum or reel C. This system consists of the pump 35, the tank or other suitable source of water-supply 36, in which may be placed a disinfectant, the discharge-pipe 37, leading to the rear of the bin A, and the spray-nozzle 38, which latter is positioned to direct the liquid against the rear side of the partition 33. It will thus be seen that a greater portion of the particles of dust and dirt discharged into the bin A that do not immediately fall to the bottom thereof will accumulate on the sprayed side of the partition 33, against which they are carried by the air-current, and drop therefrom by reason of their accumulated weight.

The operation of my device is as follows: After the dirt or other matter has been discharged from the conduit B to the bin A the heavier particles fall to the floor and the lighter particles which succeed in passing around the partition 33 are carried by the air-current between the bars or slats 2 of the drum or reel C. The air continues its course through the fabrics 20 out through the circular openings 3 in the disks 1 and bearing-flanges 7 and thence passes through the porous or cellular substance of the door 31 into the open air. The dust as it encounters the folds of the fabric 20 is arrested and held by the air-pressure against the cloth. As the drum revolves the ends 17 of the rods 16 come in contact with the fixed cams 14. As the rods 16 17 press upon the face of the cams they are forced radially outward, overcoming the resistance of the springs 19. The cloth which has hitherto been held by the springs is now allowed to hang loosely. As the ends of the arms 17 drop from the projection or cam-surface 14$^a$ into the depressions 14$^b$ of the cams the cloth is pulled taut with a sudden jerk, thus dislodging the dust which has accumulated on the surface and in the meshes of the fabric. The dust thus loosened drops to the floor of the bin between the wings 25, by which it is prevented from being scattered. The knocker-arm 23 is positioned to slip from engagement with a slat 1 and strike the next succeeding one at substantially the time that the cams have let go of the arms 17, the bar or slot being struck having the fold of cloth next to be jerked secured thereto. It is apparent however, that the hammer may be positioned to strike a slot either before or after its associated fold of fabric has been jerked by the operation of the rod 16, as its object is to impart vibration to the cloth 20 and also the frame of the reel in addition to that due to the jerking movement of the rods 16. Extremely-fine particles of dust which have escaped the action of the dust-collector above described come in contact with the porous or cellular door 31 and are arrested and held until the door is cleaned, which cleaning may take place at convenient intervals.

It is obvious that such changes in the form, proportion, and minor details of construction of the parts as fairly fall within the scope of my invention may be made without departing from the spirit or sacrificing any of the advantages thereof.

Having thus described my invention, what I claim as new, and desire to secure by Letters Patent, is—

1. In a dust-collector, an open reel or drum having its periphery formed with equidistant bars or slats, an open-meshed fabric secured circumferentially of the reel or drum and having a fold loosely disposed between each pair of bars or slats, a separate radially-movable member loosely engaging the inner extremity of each of said folds, a spring associated with each of said members for normally retaining the engaged fold taut, and a cam member fixed to the axis of the reel or drum for coacting with and imparting an outward radial movement to each of said fold-engaging members at a fixed point in its travel to cause the tension on the fold to be lessened and suddenly renewed for the purpose described.

2. In a dust-collector, an open reel or drum having its periphery formed with equidistant bars or slats, a series of radially-movable rods concentrically secured within the reel or drum in position to radially alternate with the bars or slats, two arms projecting at right angles from each of said rods and in the same plane, an open-meshed fabric secured circumferentially of the reel or drum and having a fold disposed between each pair of rods and loosely looped under the radially-alining rod, means coacting with said arms for normally retaining the folds taut, and a cam member fixed axially within the reel or drum for coacting with and imparting an outward radial movement to each arm at a fixed point in its travel and adapted to permit a sudden return of said arm to its normal position, whereby the associated fold is loosened and suddenly jerked to free itself of accumulated matter.

3. In a dust-collector, an open reel or drum having its periphery formed with equidistant bars or slats, an open-meshed fabric secured circumferentially of the reel or drum and having a fold loosely disposed between each pair of bars or slats, a plurality of radially-movable rods loosely engaging the folds of fabric, arms rigidly projecting from said rods at right angles to their body portions and in a radial plane therewith, tension means associated with the arms of each rod for normally holding the engaged fold of fabric taut, and a cam member disposed axially within the reel or drum having an abrupt peripheral depression and coacting with the ends of said arms for causing an outward radial movement of each at a fixed point in its line of travel, whereby the associated fabric fold is loosened and drawn taut for the purpose described.

4. In a dust-collector, a reel or drum comprising end disks and equidistant bars or slats forming the periphery thereof, a pair of axially-arranged concentric flanges secured to the inner faces of the disks and having openings disposed in radial alinement, an open-meshed fabric secured circumferentially of the reel or drum and having a fold loosely disposed between each pair of bars or slats, a separate rod engaging each fold of the fabric and having its extremities bent to project through the alining openings in said flanges, a spring on each bent end of said rods for causing the fabric folds to be normally held taut, and fixed axial cams for engaging the bent ends of the rods and causing each to be radially moved at a fixed point in its revolution to loosen and jerk the engaged fabric fold for the purpose described.

5. In combination, a closed chamber, a rearwardly-slanting partition arising from the bottom of said chamber and having its top terminating below the top of the chamber and formed with a rearwardly-projecting flange, a rotatable dust-collecting mechanism mounted within said chamber in advance of said partition, and a conduit communicating with the upper part of said chamber in position to direct its air-discharge against the rear wall of the chamber by which it is directed down and forward against the partition and around the flange thereon before it is permitted to enter the dust-collector mechanism.

6. In combination, a chamber, a rearwardly-slanting partition arising from the bottom of the chamber and having its top terminating below the top of the chamber and, formed with a rearwardly-projecting flange, a rotatable dust-collecting mechanism mounted within said chamber in advance of said partition, a conduit communicating with the upper part of said chamber in position to direct its air-discharge first against the rear wall of the chamber by which it is directed forward against the partition and around the flange thereon before entering the dust-collector mechanism, and means for spraying said partition for the purpose of gravitating a considerable portion of the dust carried by the air-discharge.

In witness whereof I have hereunto signed my name to this specification in the presence of two subscribing witnesses.

BERNARD KERN, Jr.

Witnesses:
CORNELL SCHREIBER,
C. W. OWEN.